March 12, 1974  G. R. ZAMBON  3,796,646
WORK RACK AGITATION DEVICE
Filed April 27, 1971  5 Sheets-Sheet 1
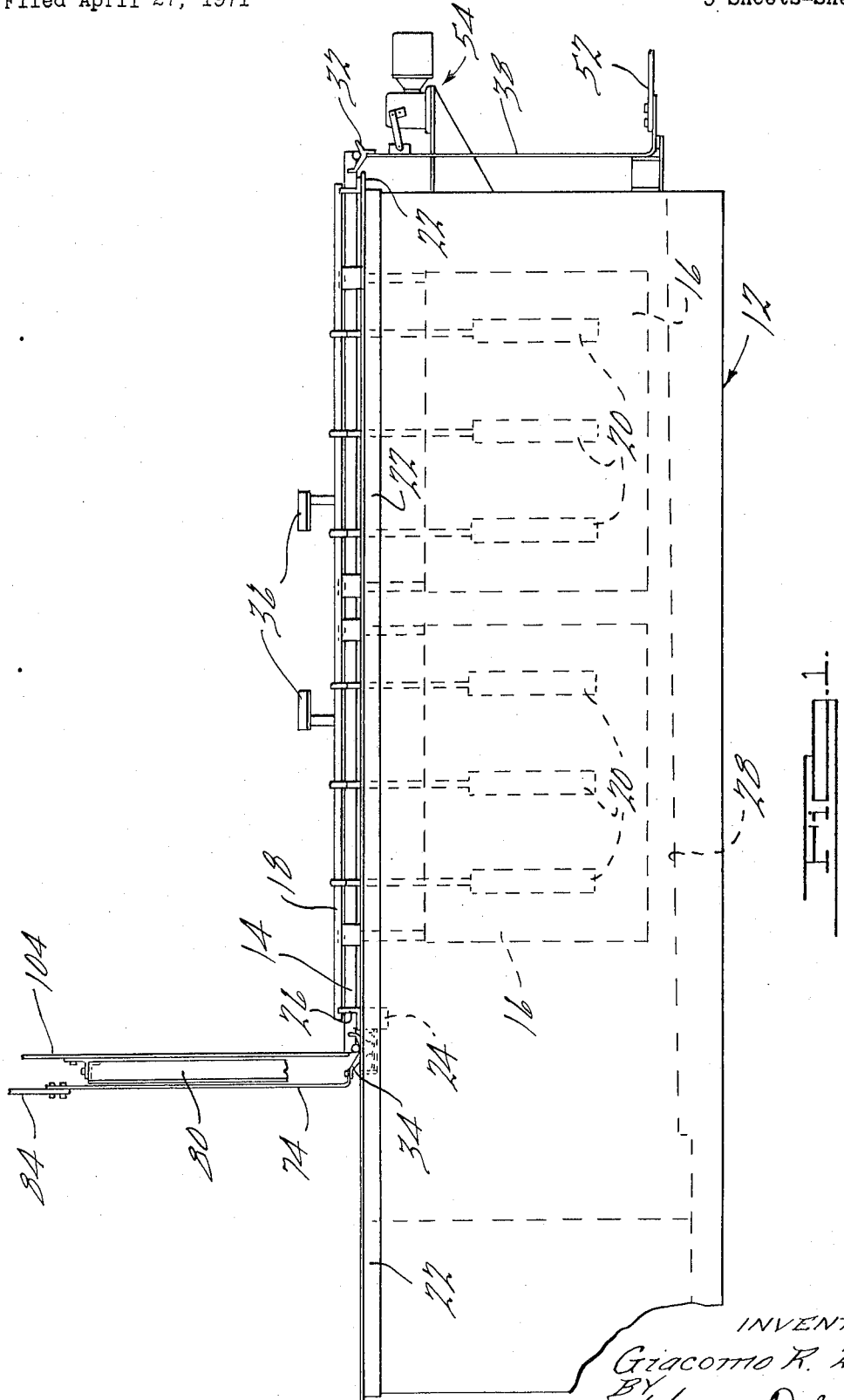
INVENTOR.
Giacomo R. Zambon
BY
Carnes, Dickey & Pierce
ATTORNEYS.

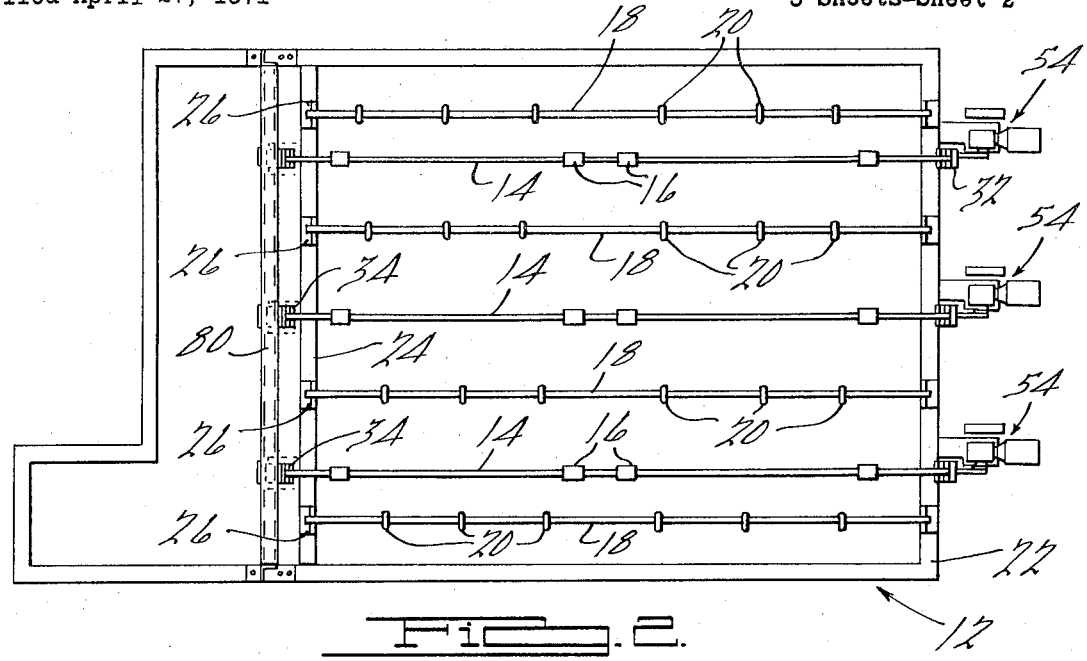
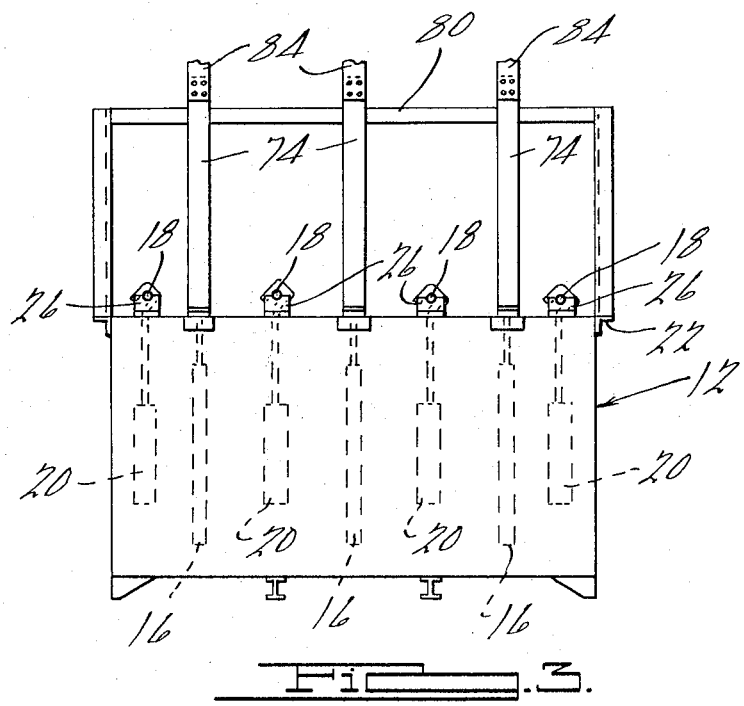

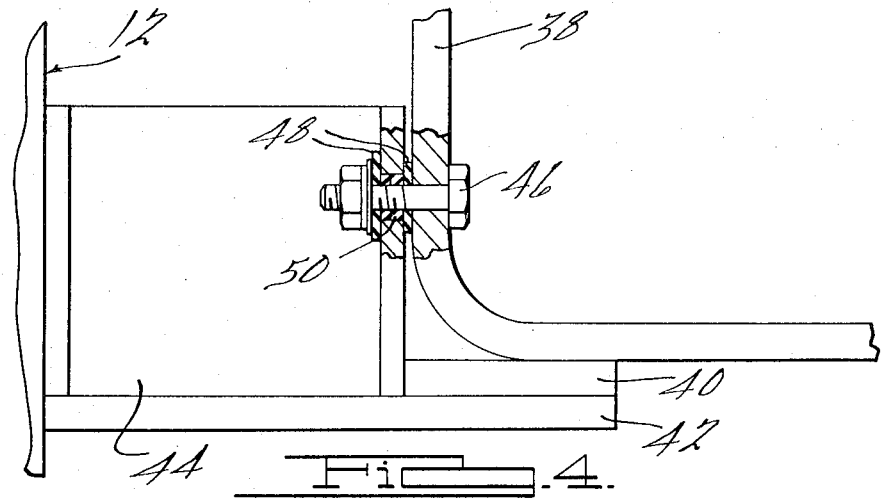
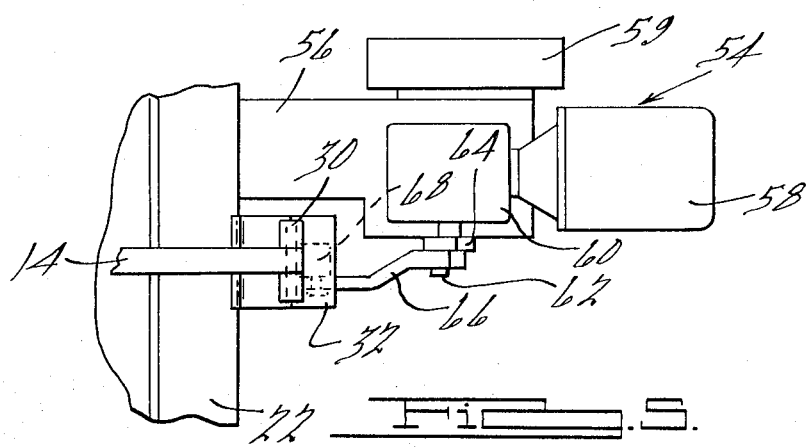
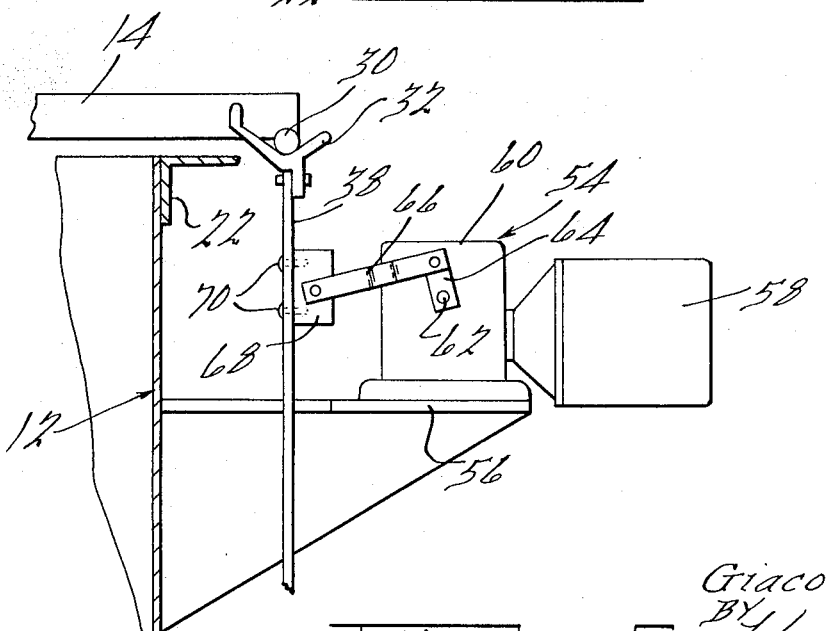

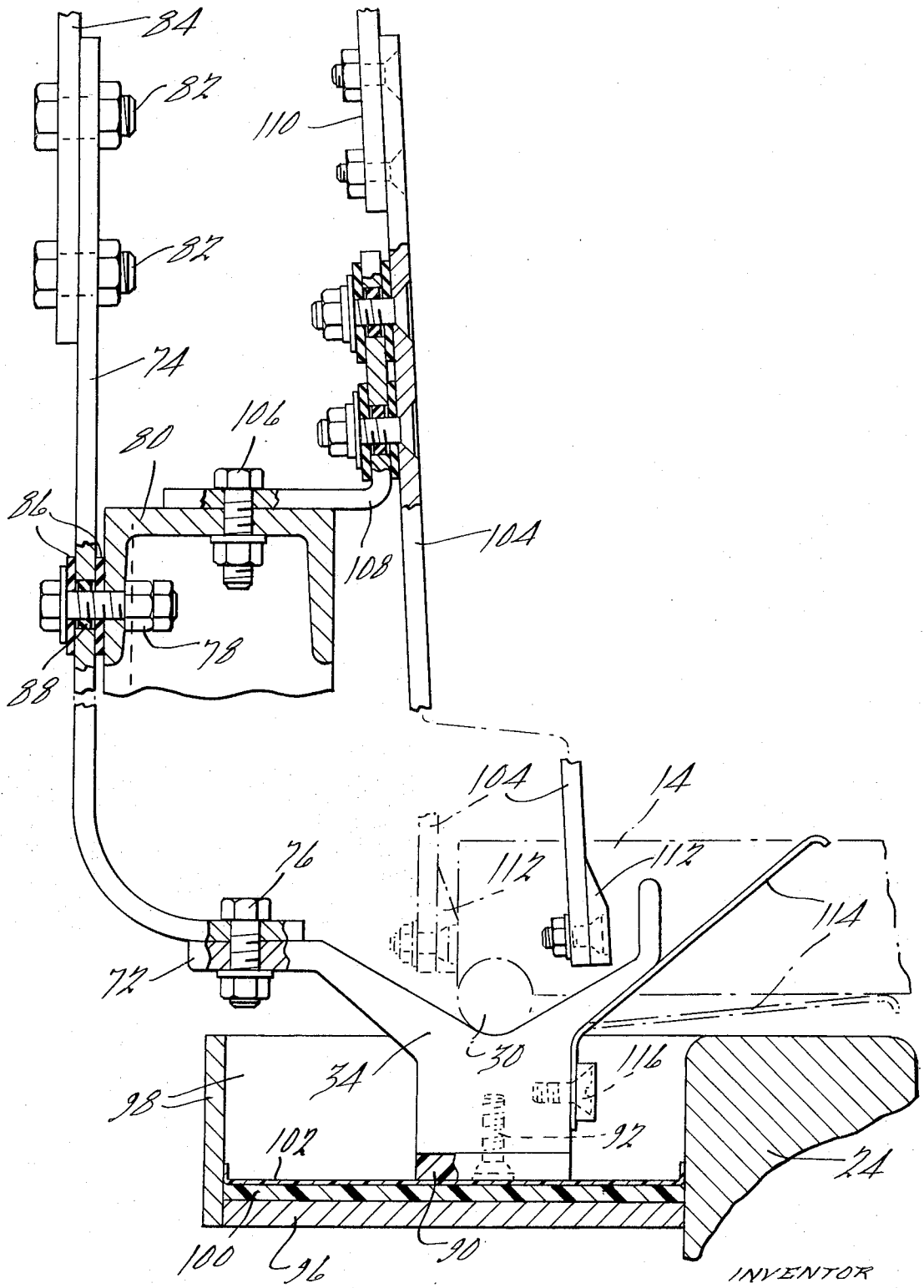

March 12, 1974 — G. R. ZAMBON — 3,796,646
WORK RACK AGITATION DEVICE
Filed April 27, 1971 — 5 Sheets-Sheet 5
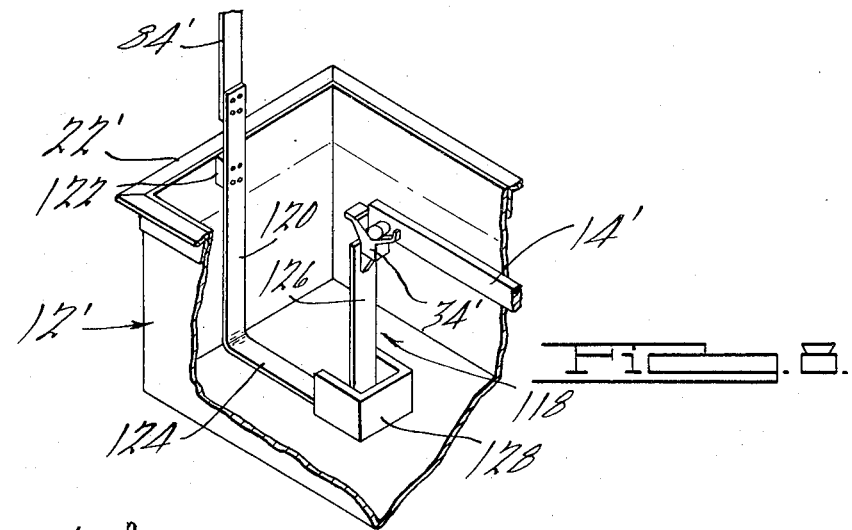
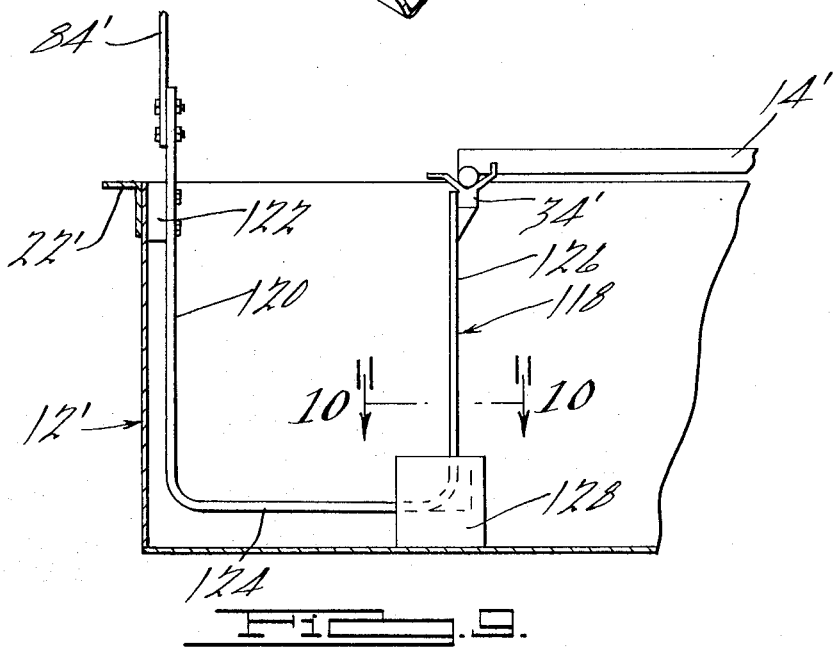
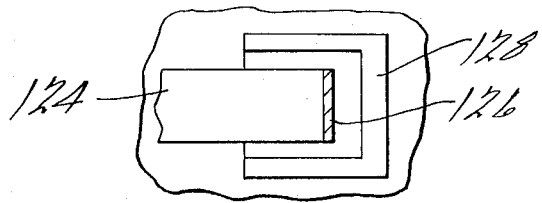
INVENTOR.
Giacomo R. Zambon
BY
Harness, Dickey & Pierce
ATTORNEYS

United States Patent Office 3,796,646
Patented Mar. 12, 1974

3,796,646
WORK RACK AGITATION DEVICE
Giacomo R. Zambon, Warren, Mich., assignor to
The Udylite Corporation
Filed Apr. 27, 1971, Ser. No. 137,809
Int. Cl. B01k 3/00
U.S. Cl. 204—222          9 Claims

ABSTRACT OF THE DISCLOSURE

An agitation mechanism for supporting workpieces in a liquid treating solution and for effecting reciprocating movement thereof relative to the solution to enhance treating efficiency.

BACKGROUND OF THE INVENTION

Various devices have heretofore been used or proposed for use for increasing the rate of treatment of workpieces while immersed in liquid treating solutions by causing relative movement between the surfaces to be treated and the solution, assuring improved contact and reaction therebetween. Electroplating operations are typical of such liquid treating processes which require constant solution agitation to avoid the formation of stagnant liquid films or layers adjacent to the workpiece surfaces which become depleted of the reactive constituents therein. Besides the conventional pumping and propeller-type agitation devices that are used to effect a rapid circulation of the treating solution relative to the workpieces, various mechanical devices have heretofore also been employed for physically moving the workpieces relative to the solution to assure a continuous fresh supply of solution in contact with the workpiece surfaces. The corrosive atmospheres normally associated with such liquid treating processes has frequently resulted in a rapid deterioration of the operating components of prior art type mechanical agitation devices requiring frequent maintenance and a premature failure thereof. For this and other reasons, such mechanical-type agitation devices have not been adopted to their fullest extent.

The prevent invention supplies a long-felt, heretofore unfilled need by providing a mechanical agitation device which is of substantially simple and compact design and due to the minimum number of moving parts, assures continued satisfactory, substantially maintenance-free operation. The agitation mechanism is further characterized as being of flexible and versatile use, enabling electrification of the workpieces directly through the components thereof, providing for still further economy in its construction and use.

SUMMARY OF THE INVENTION

The benefits and advantages of the present invention are achieved by an agitation mechanism which is associated with a body of a treating solution such as confined within a treating tank and into which workpieces are sequentially immersed during the course of a prescribed treating cycle. A suitable framework is provided adjacent to the receptacle on which a pair of high strength flexible members are mounted in longitudinally spaced relationship and incorporate supporting means thereon for engaging the end portion of a suitable work bar or work rack adapted to extend in supported relationship therebetween. Each of the flexible members are mounted on the framework at a position spaced from the supporting means thereon so as to enable a resilient flexing thereof with a corresponding lateral movement of the supporting means thereon. Drive means are drivingly connected to one of the members to effect a flexing thereof and a corresponding reciprocation of the supporting means and work bar engaged thereby through a predetermined amplitude at a preselected frequency, assuring relative movement between the surfaces of the workpieces and the treating solution in which they are immersed.

In accordance with one embodiment of the present invention, one of the flexible members is suspended from an A-frame extending above the treating receptacle and the work rack supporting means thereon is slidably supported on a bearing plate affixed to the framework. In accordance with an alternative embodiment, a flexible member is immersed in the treating solution and is guidably and movably supported by a guide block submerged in the receptacle to permit the required flexing movement of the support means affixed to the upward end portion theerof projecting above the solution level.

Still further advantages and benefits of the present invention will become apparent upon a reading of the description of the preferred embodiments taken in conjunction with the accompanying drawings.

BRIEF DESCRIPTION OF THE DRAWINGS

FIG. 1 is a side elevational view of a treating tank provided with an agitation device constructed in accordance with one of the embodiments of the present invention;

FIG. 2 is a plan view of the three-station treating tank shown in FIG. 1;

FIG. 3 is an end elevation view of the treating tank shown in FIGS. 1 and 2;

FIG. 4 is a magnified fragmentary side elevational view, partly in section, of a mounting bracket for the agitation device shown in FIG. 1;

FIG. 5 is a magnified plan view of the agitation device drive mechanism;

FIG. 6 is a magnified fragmentary side elevational view of the agitation device drive mechanism shown in FIG. 5;

FIG. 7 is a magnified fragmentary side elevational view, partly in section and partly in phantom, of the work carrier support extending upwardly above the treating tank as shown in FIG. 1;

FIG. 8 is a fragmentary perspective view with portions thereof broken away illustrating an alternate satisfactory form of a work carrier support adapted to be immersed in the treating liquid;

FIG. 9 is a side elevational view of the work rack support shown in FIG. 8;

FIG. 10 is a fragmentary transverse sectional view of the work carrier support arm and guide block shown in FIG. 9 as viewed substantially along the line 10—10 thereof.

DESCRIPTION OF THE PREFERRED EMBODIMENTS

Referring now in detail to the drawings, and as may be best seen in FIGS. 1–3, a three-station treating tank or receptacle 12 is shown which is adapted to simultaneously accommodate three work bars 14 having work racks 16 suspended therefrom. The arrangement illustrated in the drawings is typical of that employed for electroplating workpieces supported on the work racks and for this purpose, the treating tank 12 is equipped with electrified bars 18 from which a plurality of anodes 20 are suspended and extend adjacent to the surfaces of the work racks.

The upper edges of the treating tank 12 are reinforced, such as by means of an angle iron frame 22, as well as by a cross member 24, extending between the sides of the tank intermediate the length thereof and securely affixed thereto. Suitable electrified saddles 26 are mounted on the frame 22 and the cross member 24 for supporting and electrifying the anode bars 18 in the usual known manner. The portion of the tank on the other side of the cross member or the left-hand side as viewed in FIGS. 1 and 2 is employed for the installation of accessory equipment, such as solution pumping, filtration or agitation equipment, as may be required to achieve satisfactory workpiece treatment. The bottom of the tank 28, as shown in FIG. 1, is sloped toward the accessory section to promote the accumulation of sludge and insoluble matter in this area, facilitating a removal thereof.

The work bars 14 are of a generally square configuration and of a tubular construction and preferably are composed of an electrically conductive material to facilitate an electrification of the workpieces mounted on the work racks 16 which are suspended therefrom. Each end of the work bar is provided with a transversely extending rod or plug 30 which is adapted to be engageably seated in V-shaped saddles 32, 34 disposed in spaced longitudinal alignment above the solution level. A pair of opposed L-shaped members 36 are securely fastened to the upper edge of the work bar, as shown in FIG. 1, to facilitate an engagement of the work bar (not shown) by a suitable conveying device operative to lift the bar to an elevation at which the lower ends of the work racks suspended therefrom clear the partitions of the treating tank, enabling a transfer thereof to the next treating station.

The saddle 32, as is best seen in FIGS. 1 and 4–6, is securely fastened in electrical contact to the upper end portion of a flexible member 38 which, in accordance with a preferred practice is composed of a high-strength electrically-conductive metal, such as copper or alloys of copper. The flexible member 38 is in the form of a strap and is of a cross sectional size so as to provide sufficient strength to support the combined weight of the work bar and workpieces when seated in the saddle 32. The lower end of the flexible member 38 is of a generally L-shaped configuration and is adapted to be seated in supporting relationship on a pad 40 which is comprised of a suitable electrical insulating material overlying a base plate 42. The base plate 42 is in turn secured to the underside of an I-beam member 44 which is adapted to be securely fastened to a frame or to the outer wall of the tank 12, as shown in the exemplary embodiment of the drawings. The lower end of the upright portion of the flexible member 38, as shown in FIG. 4, is secured such as by means of bolts 46 to the I-beam member 44 in electrically insulated relationship by using nonconductive washers 48 and an insulating sleeve 50. The horizontally projecting end of the flexible member 38, as best seen in FIG. 1, is adapted to be connected to a suitable bus bar 52, such as by means of bolts, for supplying electric current to the workpieces supported on the work bar.

In accordance with the foregoing arrangement, the upright portion of the flexible member is adapted to flex in a direction parallel to the longitudinal axis of the tank and work bar, while concurrently supporting a work bar seated in electrical contact in the saddle 32 on the upper end thereof. The lateral deflection of the flexible member and a corresponding longitudinal reciprocation of the work bar is achieved by a drive mechanism generally indicated at 54 mounted on a platform frame 56 affixed on the side wall of the tank 12. The drive mechanism, as best seen in FIGS. 5 and 6, comprises an electric motor 58 connected to a suitable power supply 59 which is drivingly coupled to a speed reducer 60 having an output shaft 62 on which a crank 64 is mounted. A connecting rod 66 is pivotally secured at one of its ends to the crank 64 and at its other end to an insulating block 68 affixed, such as by means of screws 70, to one face of the flexible member 38. Accordingly, a lateral reciprocation of the flexible member is achieved through a prescribed amplitude and at a preselected frequency in response to the rotation of the crank at the desired speed.

Ordinarily, for most electroplating operations, movement of the surfaces of the workpieces relative to the solution in the order of about 10 feet per minute is satisfactory. This relative movement can be achieved by employing the crank 64 which has an effective radius of about one inch, producing an amplitude of deflection of about two inches and which is rotated at a speed of about 30 revolutions per minute. The amplitude of lateral deflection of the flexible member and the frequency thereof can be varied from the foregoing as may be required or desired to achieve optimum agitation characteristics for a particular liquid treating process.

The opposite end of the work bar 14, as best seen in FIGS. 1 and 7, is supported by the saddle 34 which is formed with a horizontally projecting flange 72 along one edge thereof to which the horizontal leg portion of a generally upright L-shaped flexible member 74 in electrical contact, such as by means of a bolt 76. The other leg portion of the flexible member 74 extends in a generally upright direction and is secured, such as by means of a bolt 78, to the depending flange of a channel-shaped A-frame 80, which extends transversely of the tank and is supported by the frame 22, as best seen in FIG. 3. The end of the flexible member 74 projecting upwardly of the A-frame is adapted to be securely fastened, such as by bolts 82, to a bus bar 84 for effecting an electrification of the workpieces supported on the work bar. In this regard, the flexible member 74 and the saddle 34 are preferably comprised of a high-strength electrically-conductive material as in the case of the flexible member 38 and the saddle 32.

As will be noted in FIG. 7, the flexible member 74 at its connection to the A-frame 80 is electrically insulated therefrom by means of washers 86 and collar 88 which are composed of an electrically nonconductive material. The base of the saddle 34 is provided with a slide pad 90 secured thereto by means of a machine screw 92. The slide pad is of a material having a low coefficient of friction, such as a plastic material incorporating molybdenum disulfide particles, and which also electrically insulates the saddle from the framework.

The weight of the work bar and workpieces suspended therefrom is borne primarily by bearing boxes 94, within which the saddles 34 are slidably disposed. As best seen in FIG. 7, the bearing box 94 is comprised of a base plate 96 and side walls 98 forming an upwardly opening three-dimensional enclosure which is securely affixed, such as by means of welding, to the side surface of the cross member 24. The side walls 98, in combination with the cross member, provide protective splash shields to minimize inadvertent entry of treating solution into the bearing box. A supplemental pad 100 of a low friction electrically-insulating substance, such as the same material of which the pad 90 is comprised, is preferably superimposed on the base plate 96 and a liner 102 of stainless steel is disposed thereover in order to provide a smooth corrosion-resistant surface on which the saddle 34 is slidably disposed.

In accordance with this arrangement, the section of the upright leg portion of the flexible member 74 extending between its connection to the A-frame and to the saddle undergoes lateral flexing in response to the reciprocating movement of the work bar 14 disposed in seated engaging relationship in the saddle 34. The rectangular configuration of the flexible member 74 provides for guidance of the reciprocating path of travel of the saddle and work bars supported thereon during movement, while at the same time undergoing flexing in the section spaced downwardly from the A-frame. It will be apparent that the guided reciprocating movement of the two saddles and flexible members connected thereto is achieved without the use of any bearings or rollers which are susceptible to corrosive attack and seizure by the corrosive atmospheres normally encountered in such liquid treating processes.

The work bar support and agitation arrangement as previously described is typical of one in which an electrification of the workpieces is achieved after the work bar has become fully seated on the saddles 32 and 34. In such instances where an electrification of the workpieces is necessary during their lowering into and extraction from the treating solution, a supplemental contact arrangement is required, as illustrated in FIGS. 1 and 7. As is best seen in FIG. 7, a generally upright angularly inclined contact bar 104 is secured in insulated relationship by means of bolts 106 to an L-shaped bracket 108 affixed to the A-frame 80. The upper end portion of the contact bar 104 is adapted to be connected to a bus bar 110 for supplying a different amperage current thereto than that normally supplied to the saddles 32, 34 during the principal portion of electroplating cycle.

The lower end of the contact bar 104 is formed with a cam shoe 112 on one face thereof, which is of an electrically-insulating material and is adapted to coact with the end of the work bar 14, as shown in phantom in FIG. 7, for moving the contact bar out of electrical contact with the work bar.

In addition to the contact bar 104, the "hot-entry" system also employs a resiliently biased contact spring 114 which is affixed, such as by a machine screw 116, to the side of the saddle 34 and normally projects upwardly in a position as shown in solid lines in FIG. 7. It is the function of the contact spring 114 to maintain continuity of the electrification of the work bar and workpieces thereon during the small increment of vertical movement of the work bar between the fully lowered position and a position spaced upwardly therefrom at which the contact bar moves out of electrical contact with the work bar. The configuration and length of the contact spring is such that contact is made with the work bar 14 during the descending movement thereof at a point substantially corresponding to the position at which the cam shoe 112 is in engagement with the end of the work bar effecting a camming thereof and the contact bar to the left until they assume the positions as shown in phantom in FIG. 7. During the remaining downward travel of the work bar, the contact spring deflects and finally assumes the position as shown in phantom and in which position the rod 30 on the work bar is seated in electrical contact in the saddle 34, assuring continuity in the electrification of the workpieces.

At the completion of the prescribed down dwell period, the work bar is again raised by a suitable lifting device and the contact spring 114 maintains the work bar electrified during the initial lifting movement until the contact spring is released by the work bar and assumes the position shown in solid lines in FIG. 7. At this point, the cam shoe 112 rides off the end of the work bar, which then is disposed in sliding bearing contact with the contact bar 104 during its further upward travel and is adapted to become disengaged after the lower end of the work racks emerge from the electrolyte.

In accordance with an alternative embodiment of the present invention, one of the flexible members rather than being suspended above the treating receptacle by the A-frame in accordance with the general arrangement shown in FIG. 1, is instead immersed in the treating solution in a manner as shown in FIGS. 8–10. The arrangement as shown can be employed utilizing the drive mechanism previously described for effecting longitudinal reciprocation of a work bar 14' while disposed in a lowered position above the edges of a tank 12'. In the exemplary embodiment shown, a flexible member 118 of a generally U-shaped configuration has one of its upright leg portions 120 securely affixed by means of a block 122 mounted on the inside of the tank and affixed to the frame 22'. The upright leg 120 projects upwardly above the tank level and is adapted to be electrically connected to a suitable bus bar, such as the bus bar 84'. A horizontal section 124 of the flexible member 118 extends substantially parallel to the tank bottom and at its point of juncture with a second upright section 126, is disposed in supported and guided sliding contact within a guide block 128 secured to the tank bottom. The upright leg portion 126 of the flexible member projects above the solution level in the tank to which a saddle 34' is securely fastened in electrical contact therewith.

The flexible member 118 may be comprised of an electrically conductive metal which is resistant to the treating solution contained in the tank 12' or, alternatively, may comprise a high-strength copper alloy provided with a protective coating, such as a plastisol coating, on the surfaces thereof.

In accordance with the arrangement shown in FIGS. 8–10, lateral flexing of the upright section 126 occurs in response to the longitudinal reciprocation of the work bar 14' in the same manner as previously described in connection with the agitation mechanism shown in FIGS. 1–7. This arrangement also provides for an open portion of the tank extending to the left of the upright section 126 in which auxiliary equipment including pumping, filtration and agitation equipment can be located without being interfered with by the work bar or work racks.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. In a treating receptacle for containing a solution in which workpieces supported on a work bar are adapted to be immersed, the improvement comprising an agitation mechanism for moving the workpieces relative to the solution while immersed therein, said mechanism comprising a framework, a pair of flexible members mounted on said framework in longitudinally spaced relationship, supporting means on each of said members for engaging the end portion of a work bar extending in supported relationship between said members above the treating solution, said members stationarily affixed to said framework at a position spaced from said supporting means to permit a flexing thereof and a corresponding movement of said supporting means thereon, one of said members connected to and depending from a section of said framework extending above the treating receptacle and wherein said supporting means is affixed to the lower portion of the depending said member, drive means operatively associated with said members for effecting a flexing thereof and a reciprocation of said supporting means and a work bar engaged thereby through a predetermined amplitude at a preselected frequency, and bearing means on said framework for slidably supporting said supporting means on the depending said member during its reciprocating movement.

2. In a treating receptacle for containing a solution in which workpieces supported on a work bar are adapted to be immersed, the improvement comprising an agitation mechanism for moving the workpieces relative to the solution while immersed therein, said mechanism comprising a framework, a pair of flexible members mounted on said framework in longitudinally spaced relationship, supporting means on each of said members for engaging the end portion of a work bar extending in supported relationship between said members above the treating solution, said members stationarily affixed to said framework at a position spaced from said supporting means to permit a flexing thereof and a corresponding movement of said supporting means thereon, one of said members extending in a substantially upright direction upwardly beyond the level of the treating solution in a receptacle and to the upper end portion of which the supporting means are affixed, guide means in the receptacle for supporting and guiding the flexible movement of the upright said support member during flexing thereof, and drive means operatively associated with said members for effecting a flexing thereof and a reciprocation of said supporting means and a work bar engaged thereby through a predetermined amplitude at a preselected frequency.

3. In a treating receptacle for containing a solution in which workpieces supported on a work bar are adapted to be immersed, the improvement comprising an agitation mechanism for moving the workpieces relative to the solution while immersed therein, said mechanism comprising a framework, a pair of flexible members mounted on said framework in longitudinally spaced relationship, supporting means on each of said members for engaging the end portion of a work bar extending in supported relationship between said members above the treating solution, said members stationairly affixed to said framework at a position spaced from said supporting means to permit a flexing thereof and a corresponding movement of said supporting means thereon, each said supporting means comprising a saddle formed with a concave downwardly generally V-shaped configuration adapted to removably engage the work bar for imparting a reciprocating movement to the workpieces supported thereon, and drive means operatively associated with said members for effecting a flexing thereof and a reciprocation of said supporting means and a work bar engaged thereby through a predetermined amplitude at a preselected frequency.

4. The agitation mechanism as defined in claim 3, in which at least one of said supporting means is connected to a source of electrical current for electrifying the workpieces on the work bar engaged thereby.

5. The agitation mechanism as defined in claim 3, wherein said members are mounted in electrically insulated relationship on said framework and further including electrical supply means electrically connected to at least one of said members for electrifying the workpieces supported on the work bar disposed in engagement with said supporting means on said members.

6. The agitation mechanism as defined in claim 3, wherein said drive means is connected to one of said members and reciprocation of the other of said members is achieved in response to the driving coaction of the work bar engaged thereby.

7. The agitation mechanism as defined in claim 3, wherein each of said members comprises a strip of metal which is electrically conductive and of sufficient strength to support the weight of the work bar and workpieces thereon, and wherein each of said supporting means is affixed in electrical contact to one of said members and is comprised of an electrically conductive metal.

8. The agitation mechanism as defined in claim 3, wherein one of said members is in the form of a strip of metal disposed in a substantially upright position outwardly of the treating receptacle and said supporting means are affixed to the upper end portion thereof, said strip being secured to said framework adjacent to its lower end portion enabling lateral flexing thereof.

9. The agitation mechanism as defined in claim 3, wherein said drive means comprises motor means drivingly coupled to a shaft having a connecting rod thereon, said connecting rod pivotally secured to one of said members for effecting a flexing and lateral deflection thereof in response to rotation of said shaft.

References Cited
UNITED STATES PATENTS

| | | | |
|---|---|---|---|
| 1,427,877 | 9/1922 | Weeks | 204—222 X |
| 2,650,904 | 9/1953 | Davis et al. | 204—222 |
| 3,168,457 | 2/1965 | Grazen | 204—222 X |
| 3,271,290 | 9/1966 | Pianowski | 204—222 |
| 2,944,557 | 7/1960 | Borodin | 204—222 X |
| 2,505,531 | 4/1950 | Ellwood | 204—222 X |

JOHN H. MACK, Primary Examiner

D. R. VALENTINE, Assistant Examiner

U.S. Cl. X.R.

134—164; 204—223, 273, 297